Dec. 26, 1961     T. S. REESE     3,014,828
DECORATION OF PLASTIC FILM MATERIALS
Filed April 19, 1957
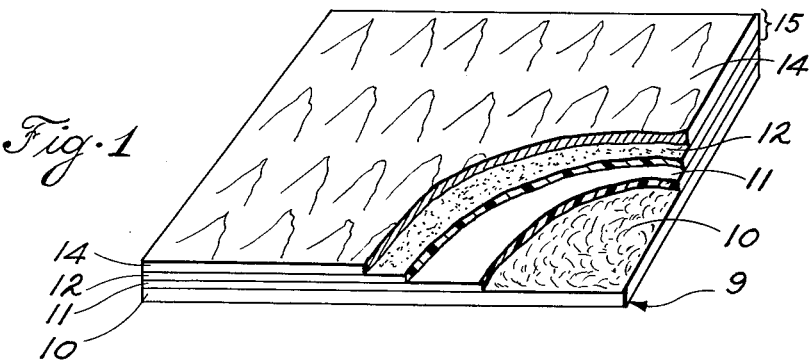
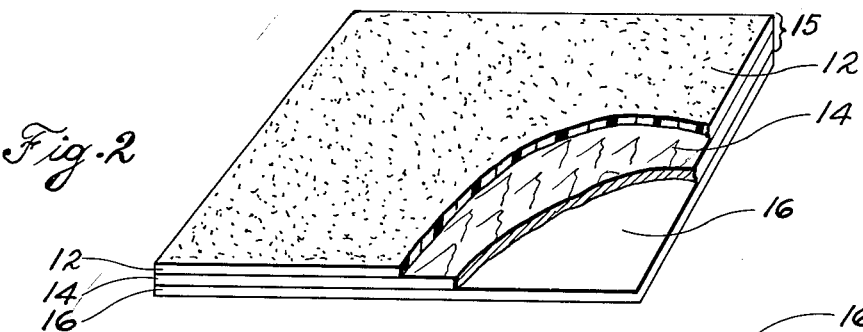
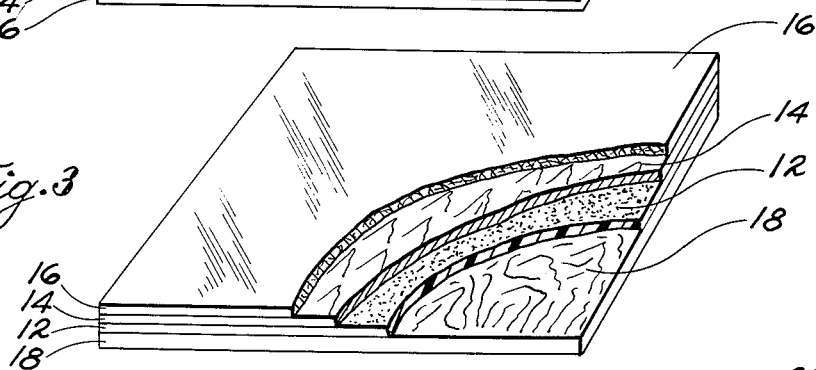
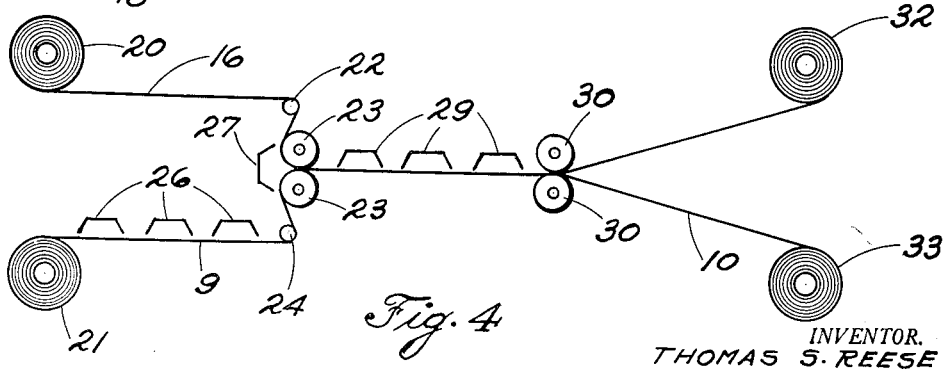
INVENTOR.
THOMAS S. REESE
BY
ATTORNEYS : 3,014,828
Patented Dec. 26, 1961

3,014,828
DECORATION OF PLASTIC FILM MATERIALS
Thomas S. Reese, University Heights, Ohio, assignor to Di-Noc Chemical Arts, Inc., Cleveland, Ohio, a corporation of Ohio
Filed Apr. 19, 1957, Ser. No. 654,015
6 Claims. (Cl. 154—46.8)

This invention relates to the decoration of plastic film materials and more particularly to the decoration of plastic film materials on which it is difficult to obtain good results by printing directly on the films. The invention is especially useful in the decoration of films of the polyester type, particularly unoriented polyester films, which are advantageous because of their physical characteristics, including excellent resistance to wear, abrasion, solvents and moisture. As herein used, the term "film" is intended to include sheeting.

The invention as a whole may be considered as embodying the following aspects: (1) a method of decorating plastic film materials which embodies making a transfer by printing the desired design or ornamentation on a backing sheet and then transferring the design to the film; (2) the transfer for decorating the plastic film; (3) the inks for making the transfers and for bonding the transfers to the film; (4) the decorated film itself; and (5) the articles decorated by means of the film.

The general objects of the invention are the provision of an improved method for decorating plastic film upon which it is difficult to print; the provision of an improved transfer for decorating such film; the provision of inks which function to bond the transfers to the film; the provision of improved apparatus for applying the transfers to the film; the provision of improved decorated film of plastic material embodying high quality printing and capable of being laminated to base material; and the provision of durable, attractively decorated articles having their surfaces decorated with the plastic film.

Other objects and advantages of the invention will become apparent from the following description of preferred forms thereof, reference being made to the accompanying drawings wherein FIGURE 1 is a diagrammatic illustration with parts broken away and with the thickness of the various layers much enlarged and not necessarily in proportion, showing a preferred form of transfer used in decorating film materials in accordance with the present invention.

FIGURE 2 is a similar illustration of the decorated film.

FIGURE 3 is a similar illustration of a sheet of base material having the film bonded thereto, and FIGURE 4 is a diagrammatic illustration of a preferred apparatus for applying the transfer to the film.

Considering first the method in general, there are various plastic film materials which are particularly desirable in products such as flooring, wall coverings and surface decorations for metal, plywood, chipboard, wallboard and the like because of their resistance to wear, abrasion, moisture and solvents but which are extremely difficult to decorate satisfactorily by direct printing and, in their oriented forms, difficult to laminate at elevated temperatures. Examples are the so-called polyester films, particularly those composed of the ethylene terephthalate polymers and the corresponding copolymers.

The usual methods of printing on plastic films, which depend on the use of inks embodying vehicles that are solvents for the film being printed on and frequently the use of the same resin in the ink as the resin making up the film, are not entirely practical with these films because active solvents for the resins are, in general, highly toxic. Not only are the films themselves inherently difficult to print, but they are produced by extrusion processes which introduce into the products minor surface irregularities, waviness, and variations in thickness that make them difficult to handle. If oriented, as by bi-axial stretching, they shrink when laminated at elevated temperatures.

According to the present invention, the printing step is eliminated and the lamination step facilitated by incorporating the design in a transfer such as that indicated in general by reference character 9 in FIGURE 1 and then transferring the design to a substantially unoriented polyester film. As shown in FIGURE 1, transfer 9 comprises a backing sheet 10 having a polyethylene stripping layer 11 thereon, a thermoplastic resin layer 12 that sometimes is pigmented, the same overlying stripping layer 11, and a continuous design layer 14 printed on the thermoplastic resin layer.

In producing this transfer, paper is preferably employed as the backing sheet. Cast coated paper such as that sold by the Champion Paper and Fibre Company of Hamilton, Ohio, under the trademark "Krome-Kote" is satisfactory. The paper has a clay coating, giving it a smooth, yet absorptive surface. In lieu of cast coated paper, other suitable papers of kinds conventionally used in making transfers may be used, if desired.

The polyethylene stripping layer 11 is preferably provided by coating the finished face of paper 10 with a solution of polyethylene in a volatile organic solvent such as xylol or high flash naphtha. Preferably, the polyethylene has a molecular weight in the range between about 12,000 and 21,000. The solution contains about 30% solids, although it may vary from at little as 5% to as much as 50%. The solution is applied by spraying, brushing, spreading, roll coating, reverse roll coating or an equivalent operation. The coating is dried in any convenient manner to form the stripping layer. The dry thickness of the stripping layer preferably is of the order of .0005".

In lieu of polyethylene, it is possible to use vinyl chloride polymers or copolymers, vinylidene chloride polymers or copolymers, or other materials that will adhere firmly to the paper and provide a smooth surface on which the transfer film may be laid down and from which the transfer film may readily be separated. Polyethylene is preferred for the reason that the stripping layer must be composed of a material which adheres firmly to the paper, which provides a smooth surface on which thermoplastic resin film 12 may be formed, and from which the latter can easily be separated at the proper time. It also must be able to withstand the heat of the subsequent operations. These requirements are particularly well satisfied by polyethylene.

After the polyethylene film has dried, a pigmented or unpigmented thermoplastic resin layer 12 is coated onto the polyethylene layer. The coating step may be accomplished by solution casting in any of its forms, but is preferably accomplished by flowing, spreading, roll coating or reverse roll coating. The coating may have a dry thickness between approximately .0005" and .0025". The coating preferably is composed of a solution of at least one or, if desired, more than one of the resins of the vinyl family; e.g., a vinyl resin, an acrylic resin, a styrene resin, an acrylonitrile resin, or the like. All of these resins contain functional radicals, which is advantageous. It is also possible to use an ethylene terephthalate or tere-isophthalate resin.

Typical formulations for the thermoplastic resin layer are given below (parts by weight):

Formulation A

| Ingredients: | Parts by weight |
| --- | --- |
| Titanium dioxide | 13.00 |
| B-73 acrylic resin [1] | 9.00 |
| A-101 acrylic resin [1] | 3.00 |
| Toluol | 13.50 |
| Xylol | 3.50 |
| Methyl ethyl ketone | 4.50 |

[1] Copolymerized methyl and ethyl esters of acrylic and methacrylic acids supplied by Rohm & Haas Company.

Formulation B

| Ingredients: | Parts by weight |
| --- | --- |
| Titanium dioxide | 13.00 |
| VAGH vinyl resin [1] | 12.00 |
| Admex 710 [2] | 2.00 |
| Diacetone alcohol | 20.00 |
| Nitroethane | 10.00 |
| Xylol | 24.00 |

[1] Vinyl chloride-vinyl acetate copolymer supplied by Bakelite Company.
[2] Polymeric-type epoxydized soya bean oil plasticizer of medium oil length supplied by Archer-Daniels-Midland Company.

In making up the above formulations, the ingredients are ground together in a pebble mill.

The thermoplastic resin layer so formed does not bond to the polyethylene stripping layer. It simply adheres lightly to it so that when the time comes, paper backing 10 and polyethylene stripping layer 11 can be dry-stripped readily from thermoplastic layer 12 without requiring the application of water or solvent to the paper. The stripping step can be accomplished without difficulty at ordinary temperatures. The polyethylene-coated paper can be re-used indefinitely.

After thermoplastic resin layer 12 has dried, design layer 14 is formed thereon. As indicated in FIGURE 1, layers 12 and 14 together constitute transfer film 15; as further indicated in FIGURE 2, transfer film 15 is subsequently bonded to polyester film 16. The printing operations by which design layer 14 is formed are preferably carried out in rotary presses with gravure plates. Depending upon the nature of the design, one or more impressions may be made, as many as four or more different colors being utilized in some designs. Elements of the design may be discontinuous, but the design layer as a whole should be substantially continuous. To this end, the design may be coated or printed overall with a solid coating, clear or pigmented, containing essentially the same materials as those used in forming the elements of the design.

The printing operation is preferably carried out with an ink made up of a composition consisting, along with the vehicle, of a major proportion of one or more thermoplastic resins such as those of the vinyl family and a minor proportion of one or more thermosetting resins of the aminoplast type; for example, one of the urea-aldehyde resins. The quantity of the thermosetting resin or resins should be sufficiently small so that the design layer will remain thermoplastic even after the thermosetting resin or resins have set up. The thermosetting resin or resins used in these inks apparently have the property of reacting under heat with the functional radicals characterizing the resins of the vinyl family, particularly those of thermoplastic resin layer 12. They also have the property of cross-linking and bonding with polyester films under superatmospheric conditions of heat and pressure.

A typical formulation for the ink is given below. under superatmospheric conditions of heat and pressure.

A typical formulations for the ink is given below.

| Ingredients: | Parts by weight |
| --- | --- |
| Titanium dioxide | 37.50 |
| VAGH vinyl resin | 12.50 |
| Urea-formaldehyde resin F-240 [1] | 2.10 |
| Admex 710 | 2.00 |
| Nitroethane | 13.00 |
| Xylol | 31.00 |
| Diacetone alcohol | 9.00 |
| Butyl alcohol | 2.00 |

[1] A dispersion of urea-formaldehyde resin supplied by Rohm & Haas Company.

The above ingredients are ground together by any suitable method, as in a pebble mill, colloid mill, etc.

It is to be noted that the bond between the ink and thermoplastic resin layer 12 is not created by the solvent used in the ink. Preferably the solvent for the ink is at most only a weak solvent for the material in layer 12. The use of such a solvent in the ink gives a superior quality of gravure printing because the dots of ink left on the thermoplastic resin surface by the printing cylinders flow out and merge with each other. With solvent inks such as are used ordinarily in the decoration of films, this flowing out action does not take place and the ink is left in discrete dots on the film.

In the meanwhile, polyester film 16 should be made ready, as by unrolling it from the supply roll, smoothing out wrinkles, and rendering it taut enough for the later application of transfer film 15. Polyester film 16 may, for example, be of the same or substantially the same chemical composition as the polyester films described in Whinfield et al. Patent 2,465,319, Swallow et al. Patent 2,497,376, and Billica Patent 2,647,885, but is not bi-axially stretched to enhance any pre-existing degree of crystallization and/or orient the molecular structure. From the standpoint of the present invention it is important that the film should not have been stretched in such fashion as to develop substantial molecular orientation, particularly bi-axial orientation.

Preferably the film comprises a polymerized alkylene ester of terephthalic acid, with or without modifiers such as copolymers. Examples of the latter are the corresponding esters of phthalic acid, isophthalic acid, 2.5 dimethyl terephthalic acid, hexahydro terephthalic acid, and sundry others. The thickness of the film may vary between a small fraction of a mill, as in a cast film, and almost any desired upper limit, as in an extruded film. Preferred for the purposes of the present invention is an extruded film having a thickness between about .0005 inch and .010 inch. A tere-iso-phthalate film is particularly satisfactory.

After transfer 9 has been completed as already described, the design is transferred to polyester film 16 by bringing the exposed surface of transfer 9 into contact with a surface of the polyester film and applying heat and pressure. The application of the heat and pressure activates and sets up the thermo-setting resin of the ink. This causes design layer 14 to adhere firmly to the polyester film 16. It also effects the desired bond between the design layer and thermoplastic resin layer 12.

Thereafter, paper backing sheet 10 carrying polyethylene layer 11 is stripped off, leaving polyester film 16 with the transfer film 15 bonded to it as shown in FIGURE 2. Firmly bonded to the surface of the polyester film 16 is the design layer 14 and firmly bonded to the latter is the thermoplastic resin layer 12. The design layer is visible through the polyester film 16. If pigmented, thermoplastic resin layer 12 provides a ground color for the design layer. Whether or not pigmented, it forms a bonding layer that can be used to bond the polyester film to a base material as indicated in FIGURE 3.

In FIGURE 3, the laminate of FIGURE 2 is shown as reversed and applied to a base material 18, here shown as a rough-surfaced metal sheet. Design layer 14 overlies thermoplastic resin layer 12; above it, polyester film 16 provides a transparent, wear-resistant and abrasion-resistant surface which is resistant also to moisture and most solvents. The laminate of FIGURE 2 can be made to adhere not only to metals such as steel, brass and aluminum but to thermo-set plastics, to heat-responsive plastics such as polystyrene, vinyl polymers and copolymers, etc., to other rigid and non-rigid plastic sheet materials that do not have the desirable physical characteristics of polyester film 16, to plywood, and to wallboards such as plasterboard, chipboard and the like. The whole constitutes a decorated base material having many uses.

Apparatus for bonding transfer 9 to polyester film 16 is shown diagrammatically in FIGURE 4. As illustrated in that figure, the apparatus may comprise a supply roll 20 for the polyester film 16 and a supply roll 21 for transfer 9. From the supply roll, polyester film 16 is led over a guide roll 22 into the nip of a pair of pressure rolls 23. Transfer 9 is led into the nip of the pressure rolls 23 from the opposite side, passing over a guide roll 24. Preparatory to the bonding operation, the exposed face of the transfer 9, that is, design layer 14, is heated, as, for example, by electric resistance heaters indicated diagrammatically at 26. Another heater 27 directed at the nip of the rolls 23 supplies heat to polyester film 16 and transfer 9 just as they are brought together.

Preferably, guide rolls 22 and 24, as well as pressure rolls 23, are surfaced with rubber or a synthetic rubber-like material, of which silicone rubber is an example. Surfacing materials of this type are conventional in similar installations. Pressure is maintained on rolls 23 to cause transfer 9 to adhere to polyester film 16. Preferably, the pressure is about 40 to 50 lbs. per lineal inch when rolls having a diameter of 6 inches coated with rubber ⅝ inch thick and of a durometer hardness of 80 are employed. The temperature of the faces of the film and transfer that are brought into contact with each other is preferably about 220° F.

In the preferred form of the apparatus, tension is applied to polyester film 16 and transfer 9 by the pressure rolls 23, which are driven, and by holding back supply rolls 20 and 21. Under the influence of the tension and the temperature, polyester film 16 is stretched slightly, say one or two percent. Transfer 9 is also stretched, preferably to a lesser degree, because of the relatively low tensile strength of the paper backing sheet. The stretching of polyester film 16 is sufficient to flatten out the film and remove waviness from it. This stretch-laminating operation tends to improve the quality of the film itself.

As noted above, the application of heat and pressure bonds thermoplastic resin layer 12 to polyester film 16. It establishes the bond between the thermoplastic resin layer 12 and design layer 14 by setting up the thermosetting resin or resins of the ink. In order to insure completion of this reaction, the assembly of polyester film 16 and transfer 9 is preferably subjected to additional heat, as by electric resistance heating elements 29, as the assembly travels through the apparatus. For example, the heat may be applied while the assembly travels through the apparatus at a speed of about 30 feet per minute.

Thereafter, the assembly passes through cooling and separating rolls 30 which remove some of the heat from the assembly. Polyester film 16 with transfer layer 15, i.e., thermoplastic layer 12 and design layer 14, bonded to it is led upwardly from rolls 30 to takeup reel 32. Paper sheet 10 with polyethylene coating 11 on it is led downwardly from rolls 30 to takeup reel 33. The polyethylene coated paper may be used over again. The decorated polyester film is ready for any of the uses noted above.

Variations in the process, product and apparatus as hereinabove described may be made by those skilled in the art. Thus in lieu of using a cast coated paper as a backing medium, it is possible to use other backing media such as machine-finished paper, textile fabrics, and continuous pellicles of various types, usually polymerized synthetic materials. In place of the polyethylene stripping layer, it is possible to use stripping layers of other types, examples being cellulose nitrate, cellulose acetate, cellulose butyrate, halogenated rubber and the like. The synthetic resin or resins used in the ink include the usual members of the group of aminoplasts such as urea-aldehyde resins, thiourea-aldehyde resins, melamine-aldehyde resins and, in general, most or all of the resins of this class. In general, aldehydes other than formaldehyde may be employed in lieu of formaldehyde; e.g., acetaldehyde, propionaldehyde, butyraldehyde, crotonaldehyde, etc. In the case of the thermoplastic resin film and the polyester film, wide variations are possible within the indicated limits.

It is intended that the patent shall cover, by summarization in appended claims, all features of patentable novelty residing in the invention.

What is claimed is:

1. A method of making a wear-resistant laminate comprising the steps of casting a first film of thermoplastic material on a backing sheet having a surface to which said film adheres lightly, the solids content of said film being composed largely of substances selected from a group of synthetic resins consisting of the saturated polyester and vinyl family resins; permitting said film to dry; printing a design on said film in an ink composed largely of a liquid vehicle, a major proportion of a thermoplastic resin, and a minor proportion of an unreacted aminoplast resin, said design forming part of a substantially continuous design layer; permitting said layer to dry; laminating a second film of thermoplastic material as a wear surface over said design layer by the application of heat and pressure, said film being composed largely of a substantially unoriented saturated polyester resin; and subjecting the composite so obtained to conditions causing the unreacted aminoplast resin in the design layer to set up and bond the films together.

2. A method according to claim 1 followed by the step of stripping off the backing sheet to expose the adjacent surface of said first film of thermoplastic material.

3. A method according to claim 2 followed by the step of adhering a base material to the exposed surface of said first film of thermoplastic material.

4. An article of manufacture comprising a base material; an overlying layer of a thermoplastic material which is composed of a member of the vinyl family; a substantially continuous decorative layer on the layer of thermoplastic material, said decorative layer consisting essentially of a major proportion of a vinyl family resin and a minor proportion of an incompletely reacted aminoplast resin; and, overlying the decorative layer, a wear surface consisting essentially of a substantially unoriented film of a saturated polyester resin.

5. An article of manufacture as set forth in claim 4 wherein the polyester resin is a polymerized ester of terephthalic acid.

6. An article of manufacture as set forth in claim 5 wherein the ester is a tere-iso-phthalate.

References Cited in the file of this patent

UNITED STATES PATENTS

| | | |
|---|---|---|
| 2,477,300 | Karfiol et al. | July 26, 1949 |
| 2,487,061 | Ptasnik | Nov. 8, 1949 |
| 2,532,941 | Rado | Dec. 5, 1950 |

(Other references on following page)

UNITED STATES PATENTS

| | | |
|---|---|---|
| 2,545,832 | Wagers et al. | Mar. 29, 1951 |
| 2,558,791 | Smith et al. | July 3, 1951 |
| 2,562,117 | Osdal | July 24, 1951 |
| 2,562,119 | Haon | July 24, 1951 |
| 2,622,991 | Sturm | Dec. 23, 1952 |
| 2,643,475 | Klopfenstein | June 30, 1953 |
| 2,663,696 | Armatys | Dec. 22, 1953 |
| 2,783,172 | Avery | Feb. 26, 1957 |
| 2,811,475 | Edge | Oct. 29, 1957 |
| 2,816,851 | Arledter | Dec. 17, 1957 |